INVENTORS
Ryuichi Sagawa
Hiroshi Sugimoto
BY
Milford A. Juten
Attorney

United States Patent Office 3,308,721
Patented Mar. 14, 1967

3,308,721
HYDRAULIC ROTARY SERVO MECHANISM
Ryuichi Sagawa, Higashinadaku, Kobe, and Hiroshi Sugimoto, Ikutaku, Kobe, Japan, assignors to Kawasaki Jukogyo Kabushiki Kaisha, Ikutaku, Kobe, Japan
Filed Apr. 6, 1965, Ser. No. 445,885
4 Claims. (Cl. 91—375)

The present invention relates to servo motors and more particularly to a servo motor which will produce a controlled angular movement of a driven or output shaft.

In the automatic control system or in the regulation system where the swing angle of the variable displacement pump driving a large sized hydraulic press, a steering gear, a turret, or a radar antenna is controlled, or the driving shaft as of a butterfly valve, of a gyrofin or of a lifting machine is controlled with an electronic signal from a remote place, it is often necessary that a slight input signal should produce a rotary motion with a great torque and that the input signal and the quantity of the rotary motion of the input signal should be regularly proportioned to each other.

An object of the present invention is to provide an automatic control system whereby a definite motion is applied to an output shaft from an input shaft moved by a very small force whereby the output shaft can control heavy equipment.

A further object is to provide a fluid operated control unit by means of a supply of fluid under pressure continuously applied to the device to produce the proper desired motion in a driven shaft.

Other and further objects will be apparent as the description proceeds and upon reference to the accompanying drawing wherein:

FIGURE 1 is a radial section taken on line 1—1 of FIG. 2 of the hydraulic rotary servo mechanism of the present invention showing the input shaft rotatably mounted at one end of a casing, a valve shaft including a stub shaft and a tubular enlargement rotatably mounted in the casing with a first piston mounted on the valve shaft and with an output shaft rotatably mounted in the bore of the valve shaft with the output shaft having a second piston and with the structure having suitable supply and outlet for fluid under pressure with control accomplished by a plate secured to the input shaft.

Figure 1:
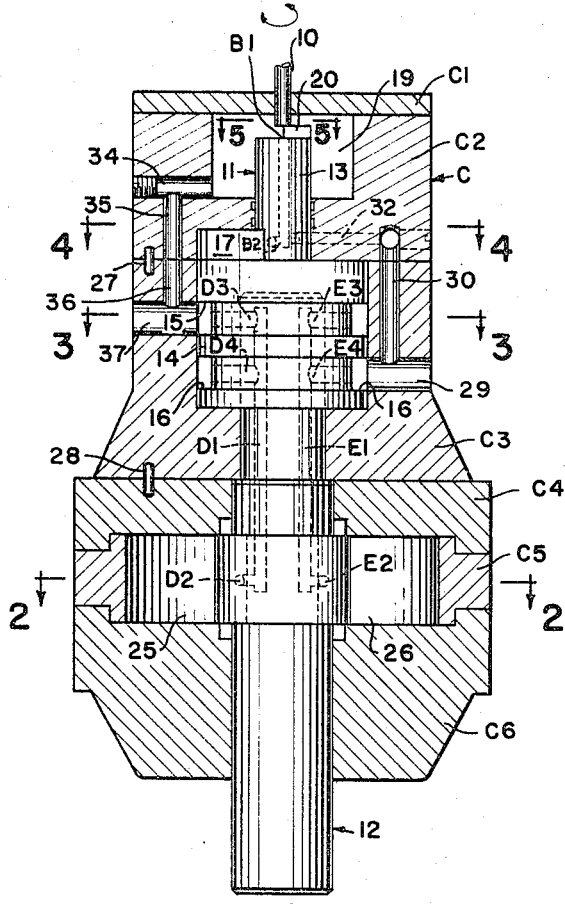

Briefly, the present invention comprises a casing having an input shaft, a valve shaft and an output shaft in axial alignment with the valve shaft being operated by a first piston which is supplied with hydraulic fluid under pressure to opposite chambers in the first cylinder and the flow of hydraulic fluid from the chambers of the first cylinder is controlled by a control plate on the input shaft, thereby determining the position of the valve shaft in accordance with the position of the input shaft. The valve shaft controls the flow of hydraulic fluid under pressure to a second piston operable in a second cylinder and driving the output shaft by controlling the flow of fluid under pressure to the expansible chambers on opposite sides of the second piston.

Referring more specifically to the drawing, the servo motor of the present invention comprises a casing C and input shaft 10, a valve shaft 11 and an output shaft 12 in axial alignment with each of the shafts being rotatably mounted in the casing. The valve shaft includes a stub shaft 13 and a tubular enlargement 14 having a pair of axially spaced annular grooves 15 and 16 around the outer periphery thereof. A first piston 17 of segmental shape extends radially from the stub shaft 13. The output shaft 12 has one end rotatably mounted in the bore of said tubular enlargement 14 and has a second piston 23 of paddle shape mounted intermediate the ends of the output shaft.

The casing includes a cover C1 in which the input shaft 10 is rotatably mounted and said casing includes a first section C2 having a sump 19 surrounding the free end of the stub shaft 13. A control plate 20 is fixed on the end of the input shaft adjacent the stub shaft and substantially covers a semi-circular area of the free end of the stub shaft. A second casing element C3 has a bore of a size to receive the tubular enlargement 14 of the valve shaft and has a bore receiving an intermediate portion of the output shaft.

The first casing element C2 has a segmental cylinder receiving the segmental shaped piston 17 of the valve shaft and providing a fluid-tight seal between the segmental cylinder and the segmental piston 17 thereby providing first and second variable volume chambers 21 and 22. A third casing element includes a first plate C4, a collar C5 forming a cylinder and an end plate C6 with the first plate C4 and the end plate C6 rotatably receiving the output shaft 12.

A second piston 23 in the form of a paddle is located within the collar cylinder C5 and radiates from the output shaft 12 and cooperates with a stationary vane 24 providing a seal between the collar C5 and the output shaft 12, thereby providing first and second variable volume chambers 25 and 26 on opposite sides of the paddle piston 23 and the vane 24. It will be apparent that suitable sealing means are provided between the paddle piston, the stationary vane and the plates C4 and C6 to provide sealing means so that the chambers 25 and 26 cannot communicate.

Suitable alignment pins 27 and 28 are provided in aligned bores in the casing elements to assure proper angular positioning thereof and suitable means are provided to retain the casing elements in assembled and fluid-tight relation but the details thereof are omitted for simplicity.

Said second casing element C3 is provided with an inlet 29 communicating with the annular groove 16 and also communicating with an axially extending passage 30 which communicates with a transverse passage 51 which in turn communicates with a first inlet passage 32 to the expansible chamber 21 of the first cylinder while a passage 33 communicates with the second expansible chamber 22 and the inlet passages 32 and 33 are provided with suitable orifices or the like to accurately control or throttle the flow of fluid to the first and second expansible chambers in the first cylinder, whereby a balanced flow may be obtained.

The stub shaft 13 is provided with a first axially extending bore or hole A1 providing a first outlet passage from the first chamber of the segmental cylinder to the free end of the stub shaft and a second axially extending bore or hole B1 provides a second outlet passage for the second chamber of the segmental cylinder to the free end of the stub shaft, whereby the control plate 20 on the output shaft may partially close said first and second outlets A1 and B1 and thereby control the flow of fluid from the first and second variable volume chambers of the first cylinder, thereby controlling the position of the segmental piston 17 and of the valve shaft 11. Radially extending passages A2 and B2 communicating with expansible chambers 21 and 22 on opposite sides of the segmental piston 8 also communicate with the axially extending outlet passages A1 and B1 thereby providing for the effective control of the fluid from such expansible chambers by the position of the control plate 20 with respect to the outlets whereby the position of the valve shaft is determined by the position of the input shaft 10 and the control plate 20 thereon.

Outlet means from the sump 19 include a duct 34 communicating ducts 35, 36 and an outlet duct 37 in communication with the annular groove 15 and also in communication with a reservoir for the hydraulic fluid (not shown). A first axially extending passage D1 in the output shaft terminates in the first chamber 25 of the second cylinder and a second axial passage E1 in the output shaft 12 communicates with the second chamber 26 by means of a radial passage E2, a similar radial passage D2 being provided for the first chamber.

A pair of radially extending passages E3 and E4 communicate between the passage E1 and the outer periphery of the output shaft while a similar pair of passages D3 and D4 extend from the axial passage D1 and provide communication under certain conditions with the annular grooves 15 and 16 in the enlargement 14 of the valve shaft 11.

The valve shaft enlargement, sleeve, or section is provided with a pair of oppositely disposed passages F1 and G1 in communication with the groove 15 and selectively adapted to be in communication with passages D3 and E3, respectively.

Figure 3:
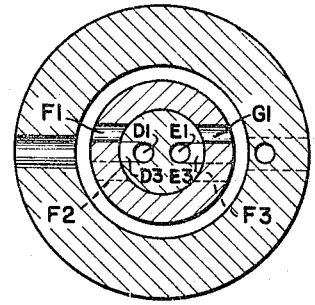
FIGURE 3 is a section taken on line 3—3 of FIGURE 1 through the tubular enlargement of the valve shaft and through one of the peripheral grooves therein and showing the passages in the valve shaft for controlling the flow of fluid to the second piston.
Figure 4:
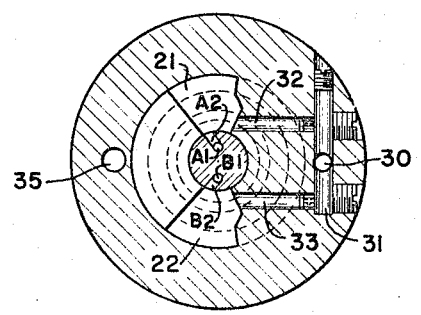
FIGURE 4 is a section taken on line 4—4 of FIGURE 1 showing the supply of fluid to the two expansible chambers in the first cylinder and showing the outlets from the first cylinder which are controlled by the plate on the input shaft.
Figure 5:
FIGURE 5 is a section taken on line 5—5 of FIGURE 1 showing the control plate partially covering the outlet at the end of the valve shaft providing for the release of pressure in the chambers of the first or segmental piston and cylinder.
Figure 2:
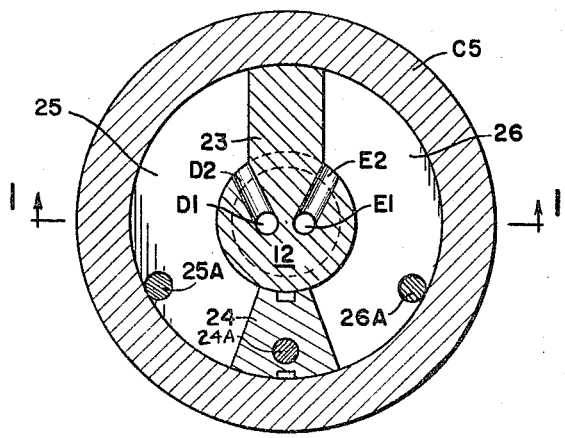
FIGURE 2 is a radial section taken on line 2—2 of FIGURE 1 showing the second piston and the fluid supply passage means for operating the same.

The valve shaft is also provided with a pair of oppositely disposed passages F2 and F3 in communication with the groove 16 and selectively adapted to be in communication with radial passages D4 and E4, respectively, thereby providing for selective communication of the chambers 25 and 26 with the inlet 29 or the outlet 37. Also, as shown in FIGURE 3, communication is prevented between the chambers 25 and 26 and the inlet and outlet thereby retaining the paddle piston 23 in a fixed position and thereby holding the output shaft 12 in a fixed position.

To prevent the paddle piston 23 from moving excessively, stop pins 25A and 26A are provided in the expansible chambers and such pins may extend into the plates C4 and C6 a desired amount to be assembled with the plates and the collar.

It will thus be seen that the present invention provides effective control of an output shaft requiring substantial torque and this is accomplished with a minimum of force applied to an input shaft whereby various electronic equipment can control a large output to accurately position the output shaft.

What is claimed is:

1. A servo motor for moving an output shaft in accordance with the movement of an input shaft to produce a substantial torque on the output shaft, said motor comprising a casing, an input shaft, a valve shaft, and an output shaft in axial alignment with said shafts being rotatably mounted in said casing, said valve shaft including a stub shaft adjacent said input shaft and a tubular enlargement, said tubular enlargement having a pair of axially spaced annular grooves around the outer periphery thereof, a segmental shaped piston extending radially from said stub shaft, said output shaft having one end rotatably mounted in the bore of said tubular enlargement, a paddle piston on said output shaft intermediate the ends thereof, said chasing including a first section having a sump surrounding the free end of said stub shaft, a cover closing said sump, said input shaft being rotatably mounted in said cover, a control plate fixed on the end of said input shaft adjacent said stub shaft and substantially covering an area of said stub shaft, a second casing element of a size to receive the tubular enlargement of said valve shaft and having a bore receiving an intermediate portion of said output shaft, said first casing element having a segmental cylinder receiving the segmental shaped piston of said valve shaft and providing a fluid-tight seal between said segmental cylinder and said segmental piston, thereby providing first and second variable volume chambers, a third casing element including a first plate, a collar forming a cylinder and an end plate, said first plate and said end plate rotatably receiving said output shaft, a stationary vane between said collar cylinder and the intermediate portion of said output shaft providing a seal between said output shaft and said collar cylinder, said first and second plates, said stationary vane and said paddle piston providing first and second variable volume chambers in said paddle piston cylinder, means to secure said casing elements in proper angular relation, said second casing element having an inlet for fluid under pressure in registry with one annular groove on the enlargement of said valve shaft for continuously supplying fluid under pressure, first inlet passage means from said inlet for fluid under pressure to the first variable volume chamber of said segmental cylinder, second inlet passage means from said inlet for fluid under pressure to the second variable volume chamber of said segmental cylinder, means to accurately control the flow of fluid to said first and second inlet passage means whereby a balanced flow may be maintained to accurately maintain the segmental piston in a desired position in the segmental cylinder, said stub shaft being provided with a first axially extending bore providing a first outlet passage from said first chamber of said segmental cylinder to the free end of the stub shaft, said stub shaft being provided with a second axially extending bore providing a second outlet passage for fluid from the second chamber of said segmental cylinder to the free end of said sub shaft whereby said control plate on said input shaft may partially close said first and second outlets and thereby control the flow of fluid from said first and second variable volume chambers of said segmental cylinder and thereby control the position of said segmental piston and valve shaft, outlet means from said sump including an outlet into the second groove of said valve shaft, a first axially extending passage in said output shaft terminating in the first chamber of said paddle cylinder and a second axially extending passage in said output shaft terminating in the second chamber of said paddle cylinder, a pair of radially extending passages from each of said axially extending passages of said output shaft for communication of one radial passage of each pair with one of said grooves and for communication of the other radial passage of that pair with the other groove, said valve shaft having a pair of oppositely disposed passages in communication with said first groove and adapted to selectively provide communication with one of the radial passages of each pair of radial passages, said valve shaft also being provided with a pair of oppositely disposed passages in communication with the second annular groove and adapted to selectively provide communication with the other radial passage of each pair of radial passages, said servo motor providing for power operation of said output shaft in the same angular direction and to the same angular extent as the rotation of said input shaft but with substantially increased torque whereby the servo motor will effectively operate said output shaft to produce the desired controlled motion thereof.

2. A servo actuator for controlling an output shaft in accordance with the displacement of an input shaft to produce a substantial torque on the output shaft, said actuator comprising a casing, said input shaft, a valve shaft, and said output shaft in axial alignment with said shafts being rotatably mounted in said casing, said valve shaft including a stub shaft adjacent said input shaft and a sleeve portion having an output shaft receiving bore, said sleeve portion having a pair of axially spaced annular grooves around the outer periphery thereof, a segmental shaped piston extending radially from said stub shaft, said output shaft having one end rotatably mounted in the bore of said sleeve portion, a paddle piston on said output shaft intermediate the ends thereof, said casing including a first casing element having a sump surrounding the free end of said stub shaft, a cover closing said sump, said input shaft being rotatably mounted in said cover, a control plate fixed on the end of said input shaft adjacent said stub shaft and substantially covering an end surface of said stub shaft, a second casing element snugly receiving said sleeve portion of said valve shaft and having a bore fitting an intermediate portion of said output shaft, said first casing element having a segmental cylinder snugly receiving said segmental shaped piston of said stub shaft in fluid-tight relation between said segment cylinder and said segmental shaped piston thereby providing first and second variable volume chambers of said segmental cylinder, a third casing element including a first plate, a collar and an end plate forming an output cylinder, said first plate and said end plate rotatably receiving said output shaft, said paddle piston on said output shaft positioned within said output cylinder, a stationary vane providing a seal between said output cylinder and the intermediate portion of said output shaft, said stationary vane and said paddle piston providing first and second variable volume chambers in said output cylinder, means to secure said casing elements in proper angular relation, said second casing element having an inlet for fluid under pressure in registry with a first of said annular grooves on the sleeve portion of said valve shaft for continuously supplying fluid under pressure, a first inlet passage means including an orifice from said inlet for fluid under pressure to said first variable volume chamber of said segmental cylinder to throttle the flow of fluid thereto, a second inlet passage means including an orifice from said inlet for fluid under pressure to said second variable volume chamber of said segmental cylinder to throttle the flow of fluid thereto, said stub shaft being provided with a first axially extending hole providing a first outlet passage from said first variable volume chamber of said segmental cylinder to end of said stub shaft adjacent said control plate on said input shaft, said stub shaft being provided with a second axially extending hole providing a second outlet passage for fluid from said second variable volume chamber of said segmental cylinder to the end of said stub shaft adjacent said control plate on said input shaft whereby said control plate on said input shaft may partially close said first and second outlet passages and thereby control flow of fluid from said first and second variable volume chambers of said segmental cylinder whereby a balanced pressure between said first and second variable volume chambers may be maintained to determine accurately the position of said segmental piston and said valve shaft corresponding to the angular position of said control plate, said second casing having an outlet in registry with the second of said annular grooves on the sleeve portion of said valve shaft, a pair of axially extending passages in said output shaft, the first axially extending passage of said output shaft terminating in said first variable volume chamber of said output cylinder, and a second axially extending passage in said output shaft terminating in said second variable volume chamber of said output cylinder, a pair of radially extending passages from each of said axially extending passages of said output shaft for communication of one radial passage of each pair with one of said grooves and for communication of the other radial passage of that pair with the other groove, said valve shaft having a pair of oppositely disposed passages in communication with said first groove and adapted to selectively provide communication with one of the radial passages of each pair of radial passages, said valve shaft also being provided with a pair of oppositely disposed passages in communication with the second annular groove and adapted to selectively provide communication with the other radial passage of each pair of radial passages, said servo actuator providing for power operation of said output shaft in the same angular direction and to the same angular extent as the rotation of said input shaft but with substantially increased torque whereby said servo actuator will effectively operate said output shaft to produce the desired controlled motion thereof.

3. A servo actuator for controlling an output shaft in accordance with the displacement of an input shaft to produce a substantial torque on the output shaft, said actuator comprising a casing, an input shaft, a valve shaft, and an output shaft mounted in operative relation on said casing, said valve shaft including a stub shaft adjacent said input shaft and a sleeve portion having an output shaft controlled shaft portion receiving bore, said sleeve portion having a pair of axially spaced annular grooves around the outer periphery thereof, said casing providing a first cylinder, a first piston operatively mounted in said first cylinder and operatively connected to said stub shaft, said output shaft controlled shaft portion having one end rotatably mounted in the bore of said sleeve portion, said casing providing an output cylinder, an output piston operatively connected to said output shaft controlled shaft portion, and said casing providing a sump surrounding a portion of said stub shaft, a cover closing said sump, said input shaft being rotatably mounted in said cover, a control plate mounted on said input shaft adjacent said stub shaft and substantially covering a surface portion of said stub shaft, said casing snugly receiving said sleeve portion of said valve shaft and having a bore receiving said output shaft controlled shaft portion, said first cylinder providing first and second variable volume chambers, said output cylinder providing first and second variable volume chambers, said casing having an inlet for fluid under pressure in registry with a first of said annular grooves on the sleeve portion of said valve shaft for continuously supplying fluid under pressure, a first inlet passage means from said inlet for fluid under pressure to said first variable volume chamber of said first cylinder to supply fluid thereto, a second inlet passage means from said inlet for fluid under pressure to said second variable volume chamber of said first cylinder to supply fluid thereto, said stub shaft being provided with a first axially extending hole providing a first outlet passage from said first variable volume chamber of said first cylinder to the surface portion of said stub shaft adjacent said control plate, said stub shaft being provided with a second axially extending hole providing a second outlet passage for fluid from said second variable volume chamber of said first cylinder to the surface portion of said stub shaft adjacent said control plate whereby said control plate on said input shaft may partially close said first and second outlet passages and thereby control flow of fluid from said first and second variable volume chambers of said first cylinder whereby a balanced pressure between said first and second variable volume chambers may be maintained to determine accurately the position of said segmental piston and said valve shaft corresponding to the angular position of said control plate, said casing having an outlet in registry with the second of said annular grooves on the sleeve portion of said valve shaft, a pair of axially extending passages in said output shaft controlled shaft portion, the first axially extending passage of said output shaft controlled shaft portion terminating in said first variable volume chamber of said output cylinder, and a second axially extending passage in said output shaft controlled shaft portion terminating in said second variable volume chamber of said output cylinder, a pair of radially extending passages from each of said axially extending passages of said output shaft for communication of one radial passage of each pair with one of said grooves and for communication of the other radial passage of that pair with the other groove, said valve shaft providing a pair of oppositely disposed passages in communication with said first groove and adapted to selectively provide communication with one of the radial passages of each pair of radial passages, said valve shaft also being provided with a pair of oppositely disposed passages in communication with the second angular groove and adapted to selectively provide communication with the other radial passage of each pair of radial passages, said servo actuator providing for power operation of said output shaft controlled shaft portion in the same angular direction and to the same angular extent as the rotation of said input shaft but with substantially increased torque whereby said servo actuator will effectively operate said output shaft to produce the desired controlled motion thereof.

4. A servo actuator for controlling an output shaft in accordance with the displacement of an input shaft to produce substantial force on the output shaft, said actuator comprising a support casing, an input shaft, a valve, and an output shaft mounted in operative relation on said casing, said valve including a seat formed in said casing and a valve body movably mounted on said seat and including a stub and a section for cooperation with an element positively connected to the output shaft and movable with the displacement of said output shaft, said valve section having means providing an inlet for fluid under pressure and means providing an outlet, said casing providing a first cylinder, a first piston operatively mounted in said first cylinder and operatively connected to said stub, said output shaft controlled element having passage means for cooperation with the passages on said valve section, said casing providing an output cylinder, an output piston operatively mounted in said output cylinder and positively connected to said output shaft and to said output shaft controlled element, said casing providing a sump surrounding a portion of said stub, a cover closing said sump, said input shaft being movably mounted in said cover, a control plate mounted on said input shaft adjacent said stub and substantially covering a surface portion of said stub, said casing snugly receiving said valve body and said stub, said first cylinder providing first and second variable volume chambers, said output cylinder providing first and second variable volume chambers, said casing having an inlet for fluid under pressure in registry with the inlet in said valve body and having an outlet for cooperation with the outlet of said valve body, a first inlet passage means from said inlet for fluid under pressure to said first variable volume chamber of said first cylinder to supply fluid thereto, a second inlet passage means from said inlet for fluid under pressure to said second variable volume chamber of said first cylinder to supply fluid thereto, said stub being provided with a first hole providing a first outlet passage from said first variable volume chamber of said first cylinder to a surface portion of said stub adjacent said control plate, said stub being provided with a second hole providing a second outlet passage for fluid from said second variable volume chamber of said first cylinder to the surface portion of said stub adjacent said control plate whereby said control plate on said input shaft may partially close said first and second holes and thereby control flow of fluid from said first and second variable volumes chambers of said first cylinder whereby a balanced pressure between said first and second variable chambers may be maintained to determine accurately the position of said first piston and said valve body corresponding to the position of said control plate, a pair of passages in said output shaft element, the first passage in said output shaft element terminating in the first variable volume chamber of said output cylinder, the second passage in said output shaft element terminating in said second variable volume chamber of said output cylinder, a second pair of passages from each of said passages terminating in said variable volume chambers of said output cylinder for selective communication with the inlet and outlet of said valve body, said valve body providing a pair of opposed passages in communication with said inlet and adapted to provide communication with one pair of said second pairs of passages to the passages to said output cylinder chambers, said valve body also providing opposed passages communicating with the outlet of said valve body and adapted to selectively provide communication with the other pair of passages of said second pairs of passages to the passages to said output cylinder chambers, said servo actuator providing for power operation of said output shaft in accordance with the direction of movement of said input shaft and in a corresponding direction and in a proportional amount with substantially increased force on said output shaft whereby said servo actuator will effectively operate said output shaft to produce the desired controlled motion thereof.

References Cited by the Examiner

UNITED STATES PATENTS

| | | | |
|---|---|---|---|
| 3,058,449 | 10/1962 | Corbett | 91—375 |
| 3,066,653 | 12/1962 | Stiglic et al. | 91—375 |
| 3,176,593 | 4/1965 | Bernstein | 91—51 |

FOREIGN PATENTS

| | | |
|---|---|---|
| 927,355 | 5/1963 | Great Britain. |

MARTIN P. SCHWADRON, *Primary Examiner.*

PAUL E. MASLOUSKY, *Examiner.*